(No Model.) 2 Sheets—Sheet 1.

J. C. ANDERSON.
CLAY REDUCER AND DISINTEGRATOR.

No. 271,589. Patented Feb. 6, 1883.

Witnesses
Henry Frankfurter
J. R. Halpenny

Inventor
J C Anderson (No Model.) 2 Sheets—Sheet 2.

J. C. ANDERSON.
CLAY REDUCER AND DISINTEGRATOR.

No. 271,589. Patented Feb. 6, 1883.

Witnesses. Inventor.
J. C. Anderson.

N. PETERS. Photo-Lithographer, Washington, D. C.

UNITED STATES PATENT OFFICE.

JAMES C. ANDERSON, OF HIGHLAND PARK, ILLINOIS.

CLAY REDUCER AND DISINTEGRATOR.

SPECIFICATION forming part of Letters Patent No. 271,589, dated February 6, 1883.

Application filed August 31, 1882. (No model.)

*To all whom it may concern:*

Be it known that I, JAMES C. ANDERSON, a citizen of the United States, residing at Highland Park, in the county of Lake and State of Illinois, have invented certain new and useful Improvements in Clay Reducers and Disintegrators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mechanism for reducing clay, clay shale, &c., into a powdered or semi-powdered condition for making brick, tiles, &c.

My invention consists in subjecting clay, clay shale, &c., to the disintegrating and reducing action of rolls having a variable peripheral outline, so that the clay to be operated upon will be subjected to rapid peripheral action of one roll coming in contact with the less-rapid peripheral action of the axis of the adjacent roll.

My invention consists, further, in providing the crushing rolls or cylinders with peripheral slotted perforations, through which the clay is forced by the pressure and abraiding action of the rolls into the interior of the rolls and subjected to the action of cutters or beaters.

My invention consists, further, of knives or beaters located within the disintegrating-rolls, whereby the clay which is forced through the peripheral openings of the rolls is still further reduced.

It consists, further, of certain details of construction hereinafter more fully set forth, and pointed out in the claims.

Figure 1:
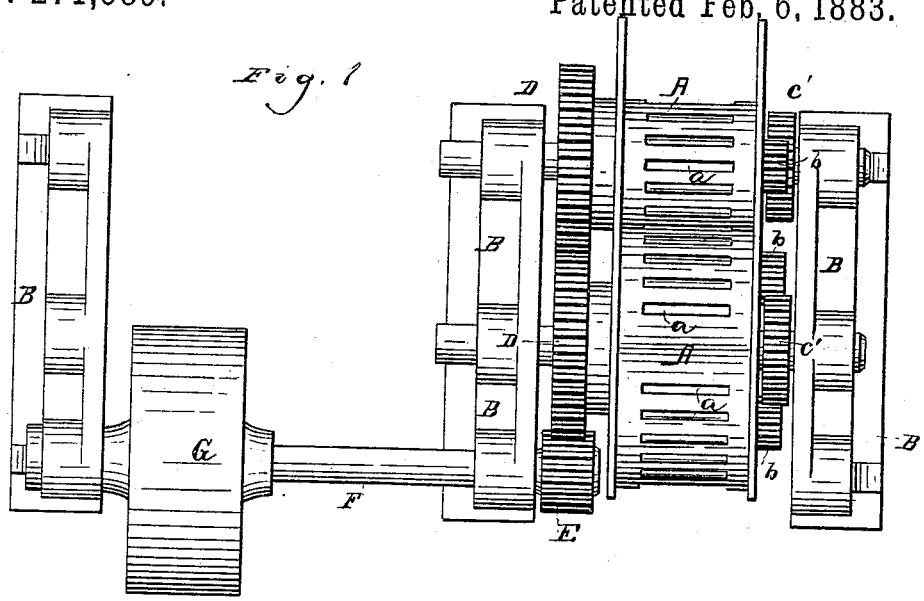
Figure 2:
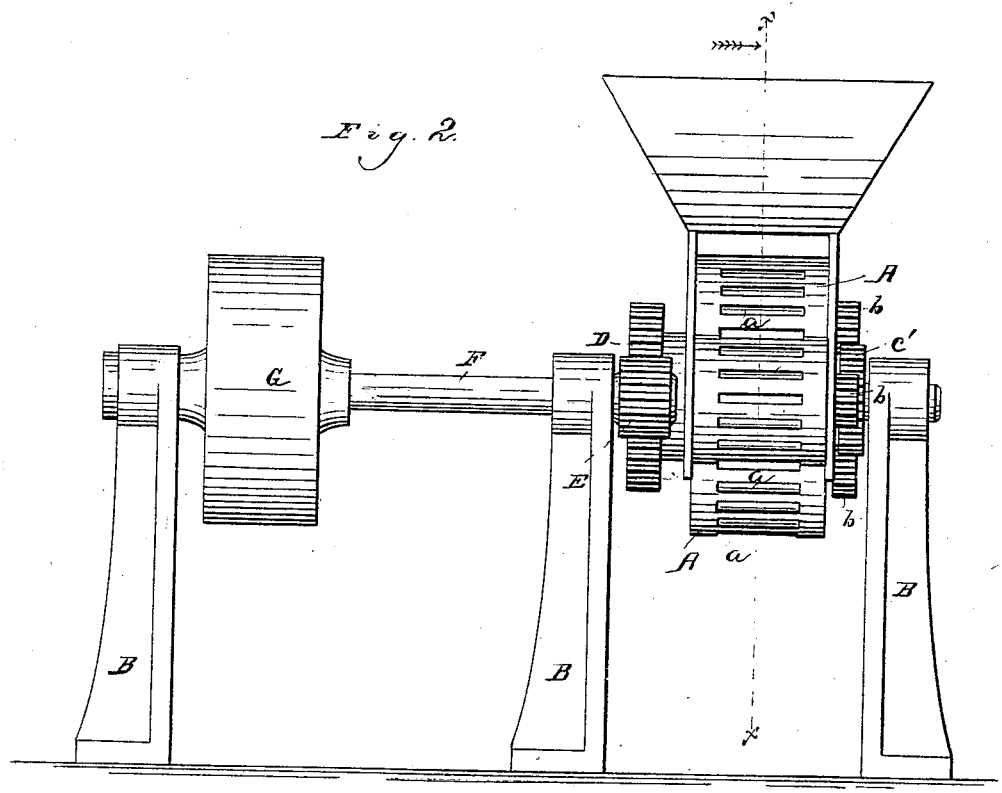
Figure 3:
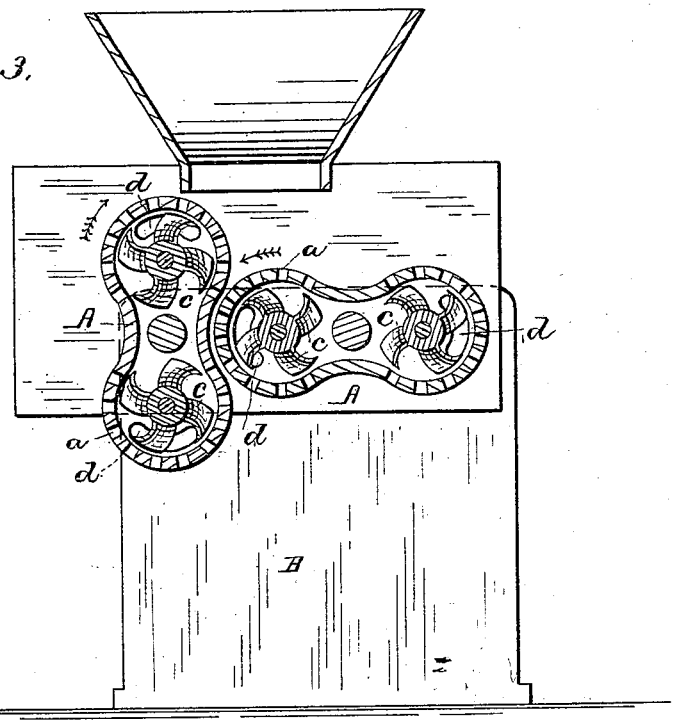
Figure 4:
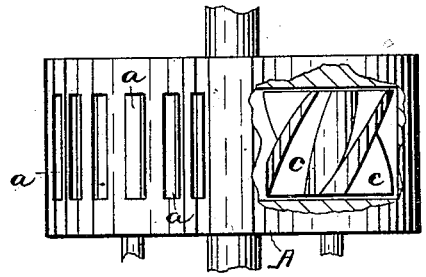
Figure 5:
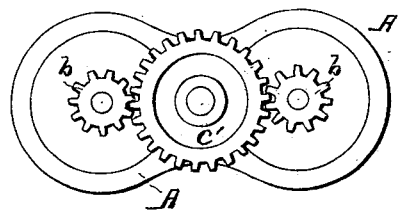

Figure 1 is a top or plan view of my machine. Fig. 2 is a side elevation. Fig. 3 is a sectional view on the line $x\ x$ of Fig. 2. Fig. 4 is a top view of one of the crushing-rolls, with a portion broken away to show the cutters located therein. Fig. 5 is a side view of Fig. 4, showing the operating mechanism.

Referring to the drawings, A designates the reducing rolls or cylinders, mounted in suitable frames or supports, B B. The reducing-rolls A A are mounted so as to revolve in opposite directions, as indicated by the arrows in Fig. 3, and are in peripheral outline of the form of the figure 8, and so mounted that the periphery of one end of the roller will come in contact with the depressed or central portion of the adjacent roll. The periphery of a roll travels faster or has a greater velocity than the axis. Consequently when the clay is caught between the rolls it is subjected to the action of the periphery of the roll acting against the center of the adjacent roll. The effect will be a rubbing or abraiding action, which will thoroughly disintegrate the clay, and not crush or compress the same only, which is the action of ordinary reducing-rolls. The rolls A are provided with a series of slots or perforations, $a$, in their peripheries, which extend through the same and open into the interior of the rolls or cylinders, and through which the clay is forced to be operated upon by revolving knives or beaters located within the cylinders.

C C are the cutters, arranged spirally on and around a common center or hub, which is mounted in bearings in the ends of the rolls or cylinders A, and are provided with pinion-wheels $b\ b$, which mesh with a larger pinion-wheel, $C'$, secured to the central shaft or axis of the rolls or cylinders A, so that by the revolution of the rolls or cylinders A the knives C will be rotated with greater velocity, and the clay which has been forced into the rolls through the slots $a$ will be cut or sliced into minute particles, and owing to the spiral position of the knives the dirt or powder-clay is thrown to one end of the cylinders and out through the openings $d$, prepared for that purpose.

The rolls or cylinders A A are provided with pinion-wheels D D, which mesh with each other and with a pinion-wheel, E, on the main driving-shaft F, said driving-shaft being mounted in suitable bearings, and provided with a pulley-wheel, G, or other suitable means for imparting power to the machine.

H is the hopper through which the material to be disintegrated is fed to the rolls; and the rolls may be made adjustable by any of the well-known means, so as to reduce the material to any desired degree of fineness.

It is well known that it is practically impossible to reduce or disintegrate clays or the harder clay shales by impingement alone.

Pressure exerted in two directions, as in the case of two impinging rolls rotated at the same speed, only flattens or flakes the clays without disintegrating them. Even the hardest rock or quartz resists, to a greater or less degree, disintegration by such means, while by the action of my machine the clay or other material is subjected to a rubbing action between the impinging surfaces, while a part thereof is forced into the slotted openings, to be acted upon by the rapid-rotating knives or beaters, and is effectually reduced to a powdered condition.

I do not wish to be understood as limiting myself in the operations of my machine to clay, clay shale, &c., for it is obvious that by providing the peripheries of my rolls or cylinders with solid surfaces—i. e., without the slots $a$ $a$—a complete reduction of ore could be accomplished, and even the grinding or reduction of grain to flour would come within the spirit of my invention.

Having thus described my invention, what I claim, and desire to secure by Letters Patent, is—

1. In a mill for reducing clay, clay shale, and other material to pulverized or powdered condition, the reducing-rolls mounted in suitable bearings, and having a variable peripheral outline, and adapted to work together, so that the rapid peripheral action of one roll will operate on the material against the less-rapidly moving periphery of the axis of the adjacent roll, whereby the material to be operated upon is subjected to a rubbing pressure, as set forth.

2. In a machine for reducing clay, clay shale, &c., to a pulverized condition, the rolls A A, of substantially the form shown and described, provided with peripheral slots $a$, and adapted to operate on the material to be reduced with a rubbing or scraping pressure, as set forth.

3. The combination of the rolls A A, provided with the peripheral slots $a$, with the knives or cutters C C, located within said rolls, whereby the clay which has been forced through the slots is cut or severed into small particles or shavings, as set forth.

4. The rolls A A, provided with pinions $c\ c$, in combination with the pinions $b\ b$ and cutters C C, substantially as and for the purpose set forth.

5. The rolls or cylinders A A, provided with the openings $d\ d$ at their ends, in combination with the spiral cutters C C, whereby the clay is thrown from the interior of the rolls, as set forth.

In testimony whereof I affix my signature in presence of two witnesses.

J. C. ANDERSON.

Witnesses:
 LILLIE E. ANDERSON,
 J. F. ANDERSON.